Patented Jan. 25, 1949

2,459,967

UNITED STATES PATENT OFFICE 2,459,967

CONCENTRATION OF NONSULFIDE ORES

Karl F. Schilling, Lakeland, Fla., assignor to Minerals Separation North American Corporation, New York, N. Y., a corporation of Maryland No Drawing. Application February 7, 1946, Serial No. 646,221

14 Claims. (Cl. 209—9)

This invention relates to the concentration of ores. Particularly, it relates to separating the components, with a view to recovering the valuable constituents, of a wide variety of non-sulfide ores and minerals. More particularly it relates to those in which non-sulfide non-silicate minerals are admixed with silicious gangue, or in which silicate minerals are admixed with quartz, or in which potash minerals occur in their soluble ores. Among such ores and minerals, to the beneficiation of which the invention is particularly adapted, are phosphate, iron ore, barite, calcite, feldspar, fluorspar, kyanite, industrial sands and the constituents of soluble ores such as sylvinite.

The invention resides in the discovery of new types of collectors which are sulfur compounds belonging to the groups of sulfurous and sulfuric acid amides and imides. Structurally, these compounds derive from sulfurous and sulfuric acids.

(sulfurous)        (sulfuric)

by substitution of one or more OH groups with one or more NH or $NH_2$ groups, the simplest being sulfurous acid and sulfuric acid mono-imide, and mono-amide.

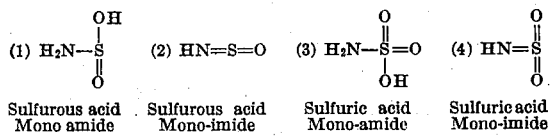

Sulfurous acid  Sulfurous acid  Sulfuric acid  Sulfuric acid
Mono amide    Mono-imide    Mono-amide   Mono-imide For purposes of clarity in the description of the general class of compounds covered by this invention, as well as in the designation of the individual compounds, a system of nomenclature has been used, as indicated above, in which these compounds are called sulfurous acid and sulfuric acid amides and imides. This system of nomenclature conforms to Beilstein's "Handbuch der Organischen Chemie," Main Work, 4th edition, and subsequent supplements. Beilstein, as well as other authorities such as Richter's "Organic Chemistry," vol. 1, 2nd English edition by Blakiston in 1919; Audrieth and Sveda, Journal of Organic Chemistry, vol. 9, page 89 (1944); Fernelius' "Inorganic Synthesis" published by McGraw-Hill in 1946 show alternative nomenclatures for some of these compounds. For example, the compounds of formula 1 above may be designated amido sulphinic acid, amido sulphurous acid, thionamic acid, etc. Compounds derived from formula 2 above are referred to by Richter as "thionyl amines." Compound 3 may be called amido sulphonic acid or sulfamic acid. Compound 4 may be referred to as sulphuryl imide or sulphamide.

All the collectors of this invention are characterized and chemically differentiated from collectors previously known to the art, by the fact that they contain one of the following fundamental groups:

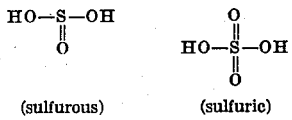

Included in this newly discovered class of collectors are the alkyl, alkylene, phenyl, cyclo-alkyl, naphthenyl groups having the empirical formulae acid and sulfuric acid amides and imides, their salts and halides.

However, to enable these compounds to function as collectors it is necessary that they contain at least one hydrocarbon group which is herein defined for convenience as a "functioning hydrocarbon group." This group may be: (a) an aliphatic group containing 7 or more carbon atoms at least 5 of which must be in a single straight chain; or (b) a hydrocarbon group such as is present in abietic acid; or (c) an alicyclic hydrocarbon such as is present in naphthenic acids; or (d) a naphthalene or substituted benzene group.

Examples of functioning hydrocarbon groups are octyl, lauryl, myristyl, stearyl, oleyl, 7-ethyl-2-methyl-undecane and abietyl groups and the naphthenyl groups having the empirical formulae $C_nH_{2n-2}O_2$ where $n$ is 8–13 and $C_nH_{2n-4}O_2$ and $C_nH_{2n-6}O_2$ where $n$ is 14–25.

The preferred collectors of the invention are those compounds which contain at least one of the above described fundamental groups and at least one functioning hydrocarbon group. The general structural formulae for these compounds may be represented as

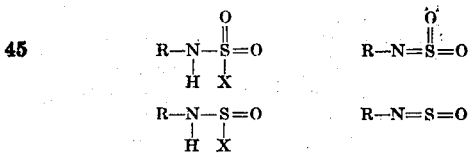

wherein R is a functioning hydrocarbon group from the class of aliphatic groups containing 7 or more carbon atoms at least 5 of which are in a single straight chain, hydrocarbon groups present in abietic and naphthenic acids and naphthalene, and substituted benzene groups. X may be OR, NRH, halogen or other salt forming group or element and at least one R in the molecule being a functioning hydrocarbon group.

These compounds are readily prepared by methods well known to those skilled in the art. For example, they may be prepared by condensing sulfurous or sulfuric acid or the substituted sulfurous or sulfuric acids with the proper amines or their hydro halides or by reacting sulfuryl chloride or thionyl chloride with amines or by reacting the ammonia salts of sulfurous or sulfuric acid with suitable organic halides. Certain compounds of the invention may be prepared by reacting a substituted sulfurous or sulfuric acid with urea. Ammonium, amine, metal and alkali metal salts of the compounds may be formed by well known procedures.

These methods of preparing the compounds of this invention may be found in the references cited above and more particularly in "Beilstein," vol. 4, page 127; in the Journal of Organic Chemistry, vol 9, pages 89–101 (1944); and in "A Comprehensive Treatise on Inorganic and Theoretical Chemistry," by J. W. Mellor, vol. VIII, pages 632–34. References giving the reaction of amino compounds with sulfuric acid or $SO_3$ containing compounds are: "Berichte der Deutschen Chemischen Ges," vol. 69B, pages 1929–37 (1936) and "An Outline of Organic Nitrogen Compounds," by E. F. Degering, published by the University Litho Printers, Ypsilanti, Michigan (1945) page 477–483. The preparation of a number of these compounds is given in detail in the examples which follow and others may be prepared by analagous methods.

The collectors of this invention have cationic activity and function as collectors for quartz, other silicious materials and sylvite. This is surprising, as heretofore cationic collectors have been considered to be basic compounds or the salts thereof, yet many of the compounds of this invention are acids and form salts with basic substances. Nevertheless these compounds as well as their salts, function as cationic active agents.

Concentrating processes of known types in which the collectors of this invention are useful include froth flotation, agglomeration with separation by means of shaking tables, underwater screens, moving belts, pneumatic launders, revolving perforated cylinders, etc. Other reagents may be used in conjunction with the collectors, appropriate to the particular process used, such as frothers, conditioners and modifiers. Of particular benefit are the water-insoluble, non-frothing hydrocarbon oils such as fuel oil, kerosene, etc. Alkalies and acids or other pH adjusters may also be employed, their utility being readily ascertained by simple experimentation with the particular ore being treated, in a manner well known in the art. In concentrating soluble ores such as potash, the process should be carried out in a saturated aqueous solution of the soluble ore constituents.

The present invention may advantageously be utilized in step procedures, in one of the steps of which the collectors described are used. Thus in the case of phosphate ores, the phosphate may be first partially concentrated by the use of the well known methods utilizing an alkali, fatty acids and a hydrocarbon oil; after which these reagents are inactivated or removed from the concentrate, for example by agitation with sulfuric acid, and then the residual quartz is removed by means of the collectors of the present invention. Or a portion of the quartz may be first removed by the agents of the present invention, followed by flotation of the phosphate with an alkali, fatty acids and a hydrocarbon oil. Purer products are obtainable by such combination methods.

Particular advantages of the collectors of this invention are the wide variety of ores to which they are applicable and the fact that in flotation they usually act immediately after being distributed in the pulp, at the most a short conditioning period being all that is required. Those compounds substantially insoluble in water may advantageously be dissolved in an organic solvent before being added to the pulp.

In such concentration processes as froth flotation, agglomeration tabling and the like, it is essential that there shall be selectively imparted to one of the ore constituents an air adherent water-repellent quality. It is the functioning hydrocarbon group, as above defined, which gives to the reagents of this invention these essential qualities. It has been found by experiment that the functioning hydrocarbon group, whether it be aromatic, arylalkyl, alicyclic or aliphatic, may permissibly contain such constituents as halogens, low-molecular weight hydrocarbon groups, or ether, thioether, ester, imino and amido linkages, without impairing its capacity for imparting air-adherence and water-repellency.

The following specific examples are given by way of illustration of various embodiments of the invention and will illustrate to those skilled in the art how it is to be practiced. Examples 1 through 8 illustrate the effectiveness of various members of the class of compounds described on phosphate ore, in the concentration of which the collectors of the invention make it possible to float or agglomerate silicious gangue; showing these various members of the class qualitatively similar in their functions. In Examples 9 through 13 a variety of ores and minerals were concentrated or purified using typical sulfurous and sulfuric acid amides and imides of the invention, illustrating its general applicability to ores of the classes referred to above.

*Example 1*

Sulfuryl chloride 73.7 grams (0.55 mol) was added without cooling to lauryl amine (commercial grade) 93 grams (0.5 mol). The reaction was quite violent and the addition was made dropwise. When the addition of sulfuryl chloride ($SO_2Cl_2$) was complete, the mixture was heated at 150° C for three minutes and then cooled and recrystallized from methanol after decolorizing with "Norite." On further recrystallization the compound lauryl sulfuric acid imide (lauryl imino sulfuryl oxide or lauryl sulfuryl imide) was obtained in white leaflets having the probable structure

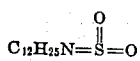

since there was no indication of chlorine in the molecule and the recrystallized product showed the proper ratio of nitrogen to sulfur on analysis, as would be expected from the excess of ($SO_2Cl_2$) used (see Mellor, vol. 8, page 633, paragraph 2, as well as other references given above, and Fritz Ephraim's "Inorganic Chemistry," A. C. L. Thorne, editor, (Nordeman Publishing Company, New York, 1939) page 641.

This product was made up as a 2.5% solution in water and tested as a collector in the froth flotation concentration of phosphate ore comprising from 33 to 37% bone phosphate of lime (B. P. L.) admixed with silicious gangue. The ore was substantially deslimed and then conditioned for 15 seconds in an aqueous pulp at 20% solids with the above product in amount of 1 pound per ton of ore. Flotation was then effected, silica being removed in the froth. The machine discharge, which was the phosphate concentrate, contained 70.3% B. P. L. with a recovery of 91.6%.

Example 2

The flotation test of Example 1 was repeated. The ore and procedure were identical and as reagent there was used 1.5 lbs. per ton of ore of the lauryl imino sulfuryl oxide prepared as described above. Results were as follows:

| Product | Per Cent Wt. | Per Cent B. P. L. | Per Cent B. P. L. Rec. |
|---|---|---|---|
| Feed | 100.0 | 39.6 | 100.0 |
| Machine Discharge | 44.1 | 76.5 | 85.1 |
| Froth Product | 55.9 | 10.5 | 14.9 |

Example 3

The test in Example 2 was repeated with all conditions and procedure identical except that 1 lb. H₂SO₄ per ton of ore was used in addition to the collector. Results were as follows:

| Product | Per Cent Wt. | Per Cent B. P. L. | Per Cent B. P. L. Rec. |
|---|---|---|---|
| Feed | 100.0 | 39.7 | 100.0 |
| Machine Discharge | 49.1 | 76.7 | 95.0 |
| Froth Product | 50.9 | 4.0 | 5.0 |

It will be noted here that the addition of 1 lb. of H₂SO₄ not only increased the grade by 0.2% but increased the recovery by 9.9% over the test where the collector was used in neutral media.

Example 4

Thirty grams of redistilled commercial lauryl amine were dissolved in dioxane and this solution saturated with sulfur dioxide gas at 10° C. No precautions were taken to eliminate moisture. When absorption of SO₂ had ceased, the resulting slurry was freed of solvent and the residue was heated at 200° C. This residue upon cooling, redissolving in dioxane and again cooling deposited white leaflets of the following probable structure:

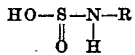

Lauryl sulfurous acid amide (lauryl amido sulfinic acid)

However at 200° C. dehydration may occur resulting in the imide being formed

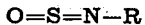

Lauryl sulfurous acid imide, on prolonged contact with water, is reconverted into the amide. One must, therefore, consider this compound a mixture of both the imide and amide.

A solution of the compound mixture was made up, 2.5% in dioxane and tested as a collector in the froth flotation concentration of phosphate ore comprising from 34%–37% bone phosphate of lime (B. P. L.) admixed with silicious gangue which was made into a pulp of 70% solids, agitated and deslimed, and conditioned for 15 seconds at 10% solids with 2 lbs. per ton of feed of the reagent mixture, lauryl sulfurous acid amide and lauryl sulfurous acid imide, and 4 lbs. per ton of feed of kerosene as auxiliary. Flotation was effected and the machine discharge, which was the phosphate concentrate, analyzed 61.6 B. P. L. with a recovery of 86.4%.

Example 5

Lauryl amine 18.5 g. (0.1 mol) was mixed with thionyl chloride, (SOCl₂) 25 g. (excess) and the resulting mixture was slowly heated, after initial reaction had ceased, to 250–280° C. Care was taken to exclude all moisture during the reaction and subsequent heating and the evolution of HCl was very heavy. On cooling, a yellow mass remained and this was quite soluble in cold water, showing no indication of chlorine in qualitative tests. Its structure is probably $$C_{12}H_{25}N=S=O$$

Lauryl sulfurous acid amide (lauryl thionyl amine)

This was tested in a 2.5% isopropanol solution as a collector in the froth flotation concentration of phosphate ore. The feed and procedure were identical with Example 1, there being used 1 lb. of the collector reagent per ton of feed. Results were as follows:

| Product | Per Cent Wt. | Per Cent B. P. L. | Per Cent B. P. L. Rec. |
|---|---|---|---|
| Feed | 100.0 | 35.4 | 100.0 |
| Froth Product | 64.0 | 14.2 | 25.6 |
| Machine Discharge | 36.0 | 73.2 | 74.4 |

Example 6

Example 5 was repeated with all conditions the same and using as before 1 lb. of lauryl sulfurous acide imide but in addition 1.0 lb. NaOH per ton of feed. Results were as follows:

| Product | Per Cent Wt. | Per Cent B. P. L. | Per Cent B. P. L. Rec. |
|---|---|---|---|
| Feed | 100.0 | 36.1 | 100.0 |
| Froth Product | 60.0 | 10.7 | 17.7 |
| Machine Discharge | 40.0 | 74.3 | 82.3 |

This example and the one following show the effect of pH on the collecting properties of the reagent. It will be noted that in an alkaline circuit but using the same amount of reagent the grade was improved 1.1% and the recovery increased by 7.9% while in the following example the action in an acid circuit lowered the grade over a neutral circuit by only 0.4% but increased recovery by 14.4%.

Example 7

Example 6 was repeated exactly except that 1 lb. H₂SO₄ per ton of feed was used in place of the NaOH. Results were:

| Product | Per Cent Wt. | Per Cent B. P. L. | Per Cent B. P. L. Rec. |
|---|---|---|---|
| Feed | 100.0 | 36.0 | 100.0 |
| Froth Product | 56.6 | 7.9 | 12.4 |
| Machine Discharge | 43.4 | 72.8 | 87.6 |

Example 8

N-lauryl sulfuric acid amide (N-lauryl sulfamic acid) was prepared by the acid hydrolysis of lauryl imino sulfuryl oxide. This consisted of warming lauryl imino sulfuryl oxide (lauryl sulfuric acid imide) in HCl acidulated water solution or suspension just below the boiling point until definite reprecipitation appeared indicating the formation of nitrogen lauryl sulfuric amide (N-lauryl sulfamic acid). One pound per ton of ore was used of this compound in the froth flotation concentration of phosphate rock. Results were as follows:

| Product | Per Cent Wt. | Per Cent B. P. L. | Per Cent B. P. L. Rec. |
|---|---|---|---|
| Feed | 100.0 | 35.4 | 100.0 |
| Froth Product | 49.9 | 3.7 | 5.2 |
| Machine Discharge | 50.1 | 66.9 | 94.8 |

The foregoing examples illustrate the applicability of the compounds to the concentration of phosphate, the following are directed to concentration of ores other than phosphate.

Example 9

A sample of Minnesota iron ore of a fineness to pass a 35 mesh screen and analyzing 22.7% Fe was made into a pulp of 20% solids and conditioned for 15 seconds with 0.5 lb. of dicyclohexyl sulfurous acid imide per ton of feed. This compound was prepared according to the method described in Example 5 except that the amine used was orthoamino dicyclohexyl and the probable structure of the compound obtained was

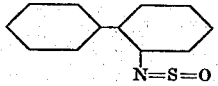

Dicyclohexyl sulfurous acid imide (dicyclohexyl thionyl amine)

In addition to the collector reagent, there was used 1 lb. $H_2SO_4$ to adjust the pH. When this pulp was subjected to a froth flotation concentration operation the following results were obtained.

| Product | Percent Wt. | Percent Fe | Percent Fe Rec. |
|---|---|---|---|
| Feed | 100.0 | 21.8 | 100.0 |
| Froth Product | 64.9 | 7.4 | 21.8 |
| Machine Discharge | 35.1 | 49.2 | 78.2 |

Example 10

The test in Example 9 was repeated except that in place of $H_2SO_4$ there was used NaOH 1 lb. and kerosene 1.0 lb., both per ton of ore. It will be noted from the results obtained that in increasing grade 1.3% recovery was decreased 2.5% as follows:

| Product | Percent Wt. | Percent Fe | Percent Fe Rec. |
|---|---|---|---|
| Feed | 100.0 | 21.8 | 100.0 |
| Froth Product | 67.4 | 7.8 | 24.3 |
| Machine Discharge | 32.6 | 50.5 | 75.7 |

Example 11

A sample of barite ore was agitated 3 minutes at 70% solids and deslimed, dried and screened to pass a 28 mesh screen. This was made into an aqueous pulp of 20% solids and 0.25 lbs. of lauryl sulfurous acid imide (prepared as described in Example 5) added per ton of feed. As auxiliaries there were added 1.0 lb. of NaOH and 1.0 lb. kerosene, both per ton of ore. Froth flotation was then effected resulting in a grade of 72.9% $BaSO_4$ with a recovery of 59.8%.

Example 12

The feed and procedure were the same as in Example 9. As collector reagent there was used 0.1 lb. lauryl imino sulfuryl oxide prepared as described in Example 1. Results were as follows:

| Product | Percent Wt. | Percent Fe | Percent Fe Rec. |
|---|---|---|---|
| Feed | 100.0 | 28.3 | 100.0 |
| Froth Product | 65.1 | 14.0 | 32.2 |
| Machine Discharge | 34.9 | 54.9 | 67.8 |

Example 13

Lauryl amine (commercial grade, redistilled) 18.5 grams was reacted in the cold with 13.7 grams of thionyl chloride ($SOCl_2$). No precautions were taken to exclude moisture, the reagents were not dry, and the evolution of HCl was very light. The temperature rose rapidly and external cooling was required. The reaction mixture was cooled and used as a reagent, without further purification, in the separation of sylvite (KCl) from sylvinite ore. The reaction product has the probable formula $RN=S=Cl_2$, N-lauryl imino sulfurous chloride. An analysis showed the proper amount of chlorine for this formula. It may hydrolyze in water to form N-lauryl amino sulfurous chloride, but this was not established to be the fact.

Sylvinite ore from Carlsbad, New Mexico, was crushed to pass a 10 mesh screen, ground in saturated brine to pass a 35 mesh screen and then deslimed, after which it was made into a pulp of about 20% solids with a saturated brine of ore constituents. The N-lauryl imino sulfurous chloride above described in the amount of 2 pounds per ton of ore, in the form of a 5% aqueous solution, was added to the pulp, which was agitated for 15 seconds, after which flotation was effected. The ore treated analyzed 17–18% KCl and the results were as follows:

| Product | Percent Wt. | Percent KCl | Percent Rec. |
|---|---|---|---|
| Feed | 100.0 | 17.6 | 100.0 |
| Machine Discharge | 80.0 | 3.3 | 15.0 |
| Froth Product | 20.0 | 74.7 | 85.0 |

Although the grade of concentrate was increased from 17.6% to 74.7%, it appears rather low by commercial standards. It should be noted, however, that only one float was used and that with one or two retreatments, such as are always used in practice, the grade would be improved. Recovery was excellent.

The compounds of the examples and the particular procedures and ores therein set forth are to be taken as illustrative merely and not as limitations of the invention which is to be construed broadly within the purview of the claims.

What is claimed is:

1. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with a collector selected from the group consisting of: sulfurous acid and sulfuric acid amides, imides, and their salts and halides, which contain at least one functioning hydrocarbon group from the class of aliphatic groups containing 7 or more carbon atoms at least 5 of which are in a single straight chain, hydrocarbon groups present in abietic and naphthenic acids, and naphthalene and substituted benzene groups; and subjecting the thus conditioned pulp to a concentration operation to separate the ore constituents.

2. The process of claim 1 wherein the said functioning hydrocarbon group is directly attached to nitrogen.

3. The process of claim 1 wherein the collector is a mixture of the acid amides and the acid imides.

4. The process of claim 1 in which the concentration operation is a froth-flotation treatment.

5. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with a substituted sulfuric acid imide containing a functioning hydrocarbon group from the class of aliphatic groups containing 7 or more carbon atoms at least 5 of which are in a single straight chain, hydrocarbon groups present in abietic and naphthenic acids, and napthalene and substituted benzene groups, and subjecting the thus conditioned pulp to a concentration operation to separate the ore constituents.

6. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with a substituted sulfurous acid amide containing a functioning hydrocarbon group from the class of aliphatic groups containing 7 or more carbon atoms at least 5 of which are in a single straight chain, hydrocarbon groups present in abietic and naphthenic acids, and naphthalene and substituted benzene groups; and subjecting the thus conditioned pulp to a concentration operation to separate the ore constituents.

7. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with a substituted sulfurous acid imide containing a functioning hydrocarbon group from the class of aliphatic groups containing 7 or more carbon atoms at least 5 of which are in a single straight chain, hydrocarbon groups present in abietic and naphthenic acids, and naphthalene and substituted benzene groups, and subjecting the thus conditioned pulp to a concentration operation to separate the ore constituents.

8. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with lauryl sulfuric acid imide and subjecting the thus conditioned pulp to a concentration operation to separate the ore constituents.

9. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with lauryl sulfurous acid amide and subjecting the thus conditioned pulp to a concentration operation to operation to separate the ore constituents.

10. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with lauryl sulfurous acid imide and subjecting the thus conditioned pulp to a concentration operation to separate the ore constituents.

11. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with a mixture of lauryl sulfurous acid amides and imides and subjecting the thus conditioned pulp to a concentration operation to separate the ore constituents.

12. The process of concentrating phosphate minerals from their ores containing silicious gangue which comprises admixing an aqueous pulp of the ore in a suitably divided state with N-monolauryl sulfurous acid amide and subjecting the thus conditioned pulp to a concentration operation to separate the ore constituents.

13. The process of concentrating phosphate minerals from their ores containing silicious gangue which comprises admixing an aqueous pulp of the ore in a suitably divided state with N-monolauryl sulfurous acid imide and subjecting the thus conditioned pulp to a concentration operation to separate the ore constituents.

14. The process of concentrating phosphate minerals from their ores containing silicious gangue which comprises admixing an aqueous pulp of the ore in a suitably divided state with N-lauryl sulfuric acid imide and subjecting the thus conditioned pulp to a concentration operation to separate the ore constituents.

KARL F. SCHILLING.

REFERENCES CITED

The following references are of record in the file of this patent:

UNITED STATES PATENTS

| Number | Name | Date |
| --- | --- | --- |
| 2,202,212 | Lecher | May 28, 1940 |
| 2,212,171 | Salberg | Aug. 20, 1940 |
| 2,300,676 | Kharasch | Nov. 3, 1942 |
| 2,312,414 | Jayne | Mar. 2, 1943 |

Certificate of Correction

Patent No. 2,459,967.   January 25, 1949.

KARL F. SCHILLING

It is hereby certified that errors appear in the printed specification of the above numbered patent requiring correction as follows:

Column 2, line 18, strike out "naphthenyl groups having the empirical formulae" and insert instead *naphthyl, abietyl and urea substituted sulfurous*; column 3, line 21, for "page 127" read *page 128*; column 6, line 17, Example 5, for "acid amide" read *acid imide*; line 35, Example 6, for "acide" read *acid*; column 10, line 13, claim 9, after "to", first occurrence, strike out "operation to";

and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*